(12) United States Patent
Bando (10) Patent No.: US 11,420,359 B2
(45) Date of Patent: Aug. 23, 2022

(54) GLASS-PLATE WORKING APPARATUS

(71) Applicant: BANDO KIKO CO., LTD., Tokushima (JP)

(72) Inventor: Kazuaki Bando, Tokushima (JP)

(73) Assignee: BANDO KIKO CO., LTD., Tokushima (JP)

( * ) Notice: Subject to any disclaimer, the term of this patent is extended or adjusted under 35 U.S.C. 154(b) by 85 days.

(21) Appl. No.: 15/752,347

(22) PCT Filed: Aug. 31, 2016

(86) PCT No.: PCT/JP2016/003977
§ 371 (c)(1),
(2) Date: Feb. 13, 2018

(87) PCT Pub. No.: WO2017/038093
PCT Pub. Date: Mar. 9, 2017

(65) Prior Publication Data
US 2019/0152095 A1    May 23, 2019

(30) Foreign Application Priority Data
Sep. 1, 2015    (JP) .............................. JP2015-172405

(51) Int. Cl.
*B24B 9/10* (2006.01)
*B28D 1/22* (2006.01)
(Continued)

(52) U.S. Cl.
CPC ................ *B28D 7/046* (2013.01); *B24B 9/10* (2013.01); *B28D 1/225* (2013.01); *B65G 49/06* (2013.01);
(Continued)

(58) Field of Classification Search
CPC ........... B24B 7/245; B24B 9/10; B24B 9/102; B24B 25/00; B24B 27/023;
(Continued)

(56) References Cited

U.S. PATENT DOCUMENTS 3,865,253 A * 2/1975 Healy .................. B65G 47/912
74/57
4,370,092 A * 1/1983 Healy .................. B65G 47/912
414/752.1
(Continued)

FOREIGN PATENT DOCUMENTS

CN      1559744 A     1/2005
CN      1853915 A    11/2006
(Continued)

OTHER PUBLICATIONS

Extended European Search Report dated Mar. 27, 2019 in European Application No. 16841126.2, 8 pages.
(Continued)

*Primary Examiner* — Joseph J Hail
*Assistant Examiner* — Arman Milanian
(74) *Attorney, Agent, or Firm* — Nixon & Vanderhye P.C.

(57) ABSTRACT

A glass-plate working apparatus 1 includes a cutting section 2 serving as a processing position for forming cut lines on a glass plate 5, a grinding section 3 serving as a processing position for grinding peripheral edges of the glass plate 5, a bend-breaking section 4 serving as a processing position between the cutting section 2 and the grinding section 3, and a glass-plate transporting section 6 for transporting the glass plates 5, and further includes a feed conveyor 7 disposed on the side of carrying in to the cutting section 2 and serving as a glass-plate carrying-in section, as well as a discharge (Continued)

conveyor 8 disposed on the side of carrying out from the grinding section 3 and serving as a glass-plate carrying-out section.

9 Claims, 10 Drawing Sheets

(51) Int. Cl.
*B65G 49/06* (2006.01)
*C03B 33/03* (2006.01)
*B28D 7/04* (2006.01)

(52) U.S. Cl.
CPC ......... *B65G 49/066* (2013.01); *B65G 49/067* (2013.01); *C03B 33/03* (2013.01); *B65G 2249/04* (2013.01); *Y02P 40/57* (2015.11)

(58) Field of Classification Search
CPC ............ B24B 27/0069; B24B 27/0076; B24B 41/005; B28D 1/225; B28D 7/046; B65G 49/06; C03B 33/03; C03B 33/033; C03B 35/145

See application file for complete search history.

(56) References Cited

U.S. PATENT DOCUMENTS

| | | | | | |
|---|---|---|---|---|---|
| 5,221,034 | A | * | 6/1993 | Bando | C03B 33/03 225/103 |
| 5,733,353 | A | * | 3/1998 | Bando | B24B 9/10 65/105 |
| 5,759,222 | A | * | 6/1998 | Bando | B24B 9/102 65/174 |
| 5,873,773 | A | * | 2/1999 | Bando | C03B 33/027 125/23.01 |
| 6,461,223 | B1 | * | 10/2002 | Bando | B24B 9/102 451/12 |
| 7,004,522 | B2 | | 2/2006 | Nagai et al. | |
| 7,059,938 | B2 | * | 6/2006 | Bando | B65G 49/064 451/12 |
| 7,735,339 | B2 | * | 6/2010 | Bando | B65G 49/064 65/106 |
| 8,079,895 | B2 | * | 12/2011 | Bando | B24B 7/245 451/12 |
| 8,550,874 | B2 | * | 10/2013 | Bando | B24B 9/102 451/5 |
| 9,283,690 | B2 | * | 3/2016 | Bando | B65G 49/064 |
| 10,357,864 | B2 | * | 7/2019 | Bando | C03B 33/033 |
| 2003/0147736 | A1 | * | 8/2003 | Nagai | H05K 13/0409 414/752.1 |
| 2018/0222785 | A1 | * | 8/2018 | Bando | B24B 9/10 |
| 2018/0290256 | A1 | * | 10/2018 | Bando | C03C 19/00 |

FOREIGN PATENT DOCUMENTS

| | | |
|---|---|---|
| CN | 102131739 A | 7/2011 |
| EP | 2 314 547 A1 | 4/2011 |
| JP | 4-21530 A | 1/1992 |
| JP | 7-2357 | 1/1995 |
| JP | 11-198124 | 7/1999 |
| JP | 2000-7362 | 1/2000 |
| JP | 2002-68768 | 3/2002 |
| JP | 2003-185987 | 7/2003 |
| JP | 2003-225878 A | 8/2003 |
| JP | 2010-47455 A | 3/2010 |
| RU | 1 192 293 A1 | 7/1996 |
| SU | 1749188 A1 | 7/1992 |

OTHER PUBLICATIONS

Decision of Refusal dated Sep. 3, 2019 in Japanese Application No. 2017-145217, with English translation, 4 pages.
Examination Report dated Jun. 27, 2019 in Indian Application No. 201837004707, 6 pages.
International Search Report for PCT/JP2016/003977, dated Nov. 29, 2016, 4 pages.
Notice of Reasons for Refusal dated May 14, 2019 in Japanese Application No. 2017-145217, with English translation, 6 pages.
Russian Office Action dated Dec. 11, 2018 in Russian Application No. 2018106684 with English "Gist of Russian Office Action," 7 pages.
Notice on the First Office Action dated Dec. 2, 2019 in Chinese Application No. 201680050256.0, with English translation, 13 pages.
Brazilian Office Action dated Feb. 18, 2020 in Brazilian Application No. BR 11 2018 003487-8, with English Gist of Brazilian Office Action, 6 pages.
KIPO Notification of Reason for Refusal dated Sep. 24, 2019 in Korean Application No. 10-2018-7005683, with English translation, 9 pages.
Notice on the Second Office Action dated Aug. 17, 2020 in Chinese Application No. 201680050256.0, with English Summarized Translation, 13 pages.
Notice of Reasons for Refusal dated Sep. 29, 2020 in Japanese Application No. 2017-145209, with English machine translation, 6 pages.
Communication Pursuant to Article 94(3) EPC dated Feb. 17, 2021 in European Application No. 16 841 126.2, 6 pages.
Third Examination Opinion Notice dated Mar. 1, 2021 in Chinese Application No. 201680050256.0, with Summarized English Translation, 8 pages.
Mahiro et al., "Press and Plastic Molding Machine," Shandong Science and Technology Publisher, Sep. 30, 2004, related pages and claims—pp. 13-16, claims 1-9, (9 pages).

* cited by examiner

GLASS-PLATE WORKING APPARATUS

This application is the U.S. national phase of International Application No. PCT/JP2016/003977 filed 31 Aug. 2016, which designated the U.S. and claims priority to JP Patent Application No. 2015-172405 filed 1 Sep. 2015, the entire contents of each of which are hereby incorporated by reference.

TECHNICAL FIELD

The present invention relates to an apparatus for working glass plates such as window glass plates of automobiles and liquid-crystal glass plates, specifically to a glass-plate working apparatus for manufacturing worked glass plates by subjecting glass plates to processing such as cutting (formation of cut lines), bend-breaking, and peripheral edge grinding, more specifically to a glass-plate working apparatus in which the processing of glass plates is finished while the glass plates are being sent sequentially to respective processing positions, such as cutting portions, bend-breaking portions, and peripheral edge grinding portions, in the respective processing positions, and more particularly to a glass-plate working apparatus equipped with an improved glass-plate transporting device in which glass plates are sequentially transported to glass-plate supporting portions in respective processing positions.

BACKGROUND ART

For example, a glass-plate transporting device, in which a plurality of processing positions each having a glass-plate supporting portion for supporting thereon a glass plate subject to processing are disposed with intervals therebetween and glass plates are sequentially transported to the glass-plate supporting portions of the respective processing positions, is comprised of a moving base which reciprocates between positions above the glass-plate supporting portions of the respective processing positions and suction pads respectively mounted on this moving base by means of lifting devices each constituted by an air cylinder unit. The glass plates are respectively adapted to be sequentially transported to the glass-plate supporting portions at the respective processing positions by the reciprocating movement of the moving base, the raising and lowering of the suction pads by the air cylinder units, and the suction of, and releasing of suction of, the glass plates by the suction pads. In particular, the air cylinder units are adapted to effect the raising and lowering of the suction pads by the on-off operation of compressed air, and hence the raising and lowering of the glass plates.

PRIOR ART DOCUMENT

Patent Document

Patent Document 1: JP-A-2002-68768

SUMMARY OF THE INVENTION

Problems that the Invention is to Solve

Incidentally, with the above-described glass-plate working apparatus, since the suction pads are arranged to be raised and lowered by the air cylinder units, it is difficult to control the raised or lowered position of the suction pads and the raising or lowering speed of the suction pads. For this reason, in the delivery of the glass plate at the glass-plate supporting base at each processing position, the suction pads must always be raised or lowered through the entire stroke of the air cylinder units. As a result, with the glass-plate transporting device using air cylinder units for raising or lowering the suction pads, it takes time to raise or lower the suction pads in the delivery of the glass plate. Furthermore, the transport of the glass plate to a next processing position upon reception of the glass plate by the suction pads must be started after waiting for the completion of raising by the contraction of the air cylinder units for lifting the suction pads, so that wasteful time is required. Consequently, it takes time to transport the glass plate from one processing position to another, so that it is impossible to expect improvement in the productivity of worked glass plates.

The present invention has been devised in view of the above-described aspects, and its object is to provide a glass-plate working apparatus which makes it possible to speed up the transport of the glass plate from one processing position to another and shorten takt time in the processing operation, thereby making it possible to further increase the productivity of worked glass plates.

Means for Solving the Problems

A glass-plate working apparatus according to the present invention comprises: at least two processing positions which each have a glass-plate supporting portion for supporting thereon a glass plate subject to processing and are arranged with an interval therebetween; and a transporting device for transferring the glass plate from the glass-plate supporting portion of one of the at least two processing positions to the glass-plate supporting portion of another one of the at least two processing positions, the transporting device including a transport shuttle which reciprocates between the glass-plate supporting portions of the one and the other processing positions and a suction pad mounted on the transport shuttle through a lifting unit, the glass-plate working apparatus being adapted to transport the glass plate from the one processing position to the other processing position through the reciprocating movement of the transport shuttle, the raising and lowering of the suction pad by the lifting unit, and the suction of, and releasing of suction of, the glass plate by the suction pad, the lifting unit including a slider crank mechanism having a crankshaft and a slider, the crankshaft being coupled to a lifting motor mounted on the transport shuttle, the suction pad being mounted on the slider and adapted to be raised and lowered by the operation of the lifting motor.

According to the present invention, the slider crank mechanism converts the rotary motion of the crank shaft due to the lifting motor to the lifting motion of the suction pads, so that it is unnecessary to rotate the crankshaft forwardly and reversely each time the suction pads are raised and lowered, and therefore it is sufficient to rotate the crankshaft in one direction. In addition, in the slider crank mechanism, a lifting/lowering speed V of the slider, i.e., the suction pads, becomes zero ($V=0$) at a top dead center and a bottom dead center at the time of turning back in the lifting and lowering of the suction pads. Namely, the speed becomes zero at a shifting position from lifting to lowering of the suction pads and at a shifting position from lowering to lifting. Further, since a deceleration (deceleration curve) to this speed $V=0$ and an acceleration (acceleration curve) from this speed $V=0$ are smooth, the suction and lifting of the glass plates from the glass-plate supporting portions by the suction pads and the lowering and placement of the glass plates onto the glass-plate supporting portions by the suction pads can be effected gently. Moreover, by adjusting the position of the bottom dead center in the raising and lowering of the suction pads to the immediate vicinities of the upper surfaces of the glass-plate supporting portions, it is possible to reliably perform the raising of the glass plates from the glass-plate supporting portions on the basis of the suction of the glass plates by the suction pads as well as the placement of the glass plates onto the glass-plate supporting portions on the basis of the release of suction of the glass plates by the suction pads.

In a preferred embodiment of the present invention, the lifting motor is a servo motor which is numerically controlled. In another preferred embodiment of the present invention, the transporting device includes a transport controlling motor for causing the transport shuttle to reciprocate. In such a preferred embodiment, as the lifting motor, preferably a servo motor, and the transport controlling motor which causes the transport shuttle to reciprocate are simultaneously controlled, in the transporting movement of the glass plate from one of the processing positions to another one of the processing positions, the lifting unit and the suction pad are caused to raise the glass plate, and, as the other processing position to which the glass plate is transferred is approached, the lifting unit is caused to gradually lower the glass plate. If such an arrangement is provided, the suction pad can be made to raise the transport height of the glass plate during the transport movement of the glass plate, thereby making it possible to avoid malfunctions such as the collision and contact with other members or the like. As the other processing position is approached to place the glass plate on the next glass-plate supporting portion, the glass plate can be gradually lowered, and when the glass plate has reached the other processing position, the suction pad can be positioned accurately at a heightwise position of a minimum distance required for the delivery of the glass plate to the glass-plate supporting portion. At this other processing position, the glass plate which has been lowered with a minimum distance is placed on the glass-plate supporting portion of the other processing position. Next, simultaneously as the emptied suction pad is raised again to the height of the necessary minimum distance, the return stroke of that emptied suction pad is started, and the emptied suction pad is further raised in conjunction with the start of the return stroke. As the one processing position is approached, the empty suction pad is lowered and is returned to above the glass-plate supporting portion of the one processing position, and the empty suction pad can be set on standby until the transport start of an ensuing glass plate. As a result, it is possible to shorten the time of receiving and raising the glass plate, the time from this raising until the start of transport to the other processing position, and the time from the lowering of the suction pad until completion of the suction and lifting of the glass plate. Furthermore, it is also possible to shorten the time until the start of transport of the received glass plate.

Therefore, according to the present invention, it is possible to shorten the glass plate transport time and quicken the start of processing operation in the processing positions, thereby making it possible to substantially increase the production speed of the worked glass plates.

In the present invention, the processing positions include those of a cutting section for forming cut lines on the glass surface by a cutter wheel, a bend-breaking section for bend-breaking along the cut lines of the glass plate with the cut lines formed thereon, and a grinding section for grinding peripheral edges of the glass plate. Also, the processing positions include a cutting and bend-breaking section for forming cut lines on the surface of the glass plate by a cutter wheel and bend-breaking the glass plate according to the cut lines, as well as the grinding section. Meanwhile, the glass-plate supporting portions include entire mechanisms on which the glass plate is placed and by which the glass plate is supported and held, and include, for example, a cutting table, a cutting and bend-breaking table, a belt conveyor of a bend-breaking section, and a grinding table.

In the present invention, in a preferred embodiment, the one processing position is that of a cutting and bend-breaking section for forming a cut line on a surface of the glass plate and for bend-breaking the glass plate according to the cut line, and the other processing position is that of a grinding section for grinding a peripheral edge of the glass plate.

Advantages of the Invention

According to the present invention, it is possible to provide a glass-plate working method and a glass-plate working apparatus which make it possible to speed up the transport of the glass plate from one processing position to another and shorten the takt time in the processing operation, thereby making it possible to further increase the productivity of worked glass plates.

MODE FOR CARRYING OUT THE INVENTION

Next, referring to the illustrative embodiment illustrated in the drawings, a description will be given of a mode for carrying out the present invention. It should be noted that the present invention is not limited to such an embodiment.

As shown in FIGS. 1 to 9, a glass-plate working apparatus 1 includes a cutting section 2 as a processing position for forming cut lines on a glass plate 5, a grinding section 3 serving as a processing position for grinding peripheral edges of the glass plate 5, a bend-breaking section 4 serving as a processing position between the cutting section 2 and the grinding section 3, and a glass-plate transporting section 6 for transporting the glass plates 5, and further includes a feed conveyor 7 disposed on the side of carrying in to the cutting section 2 and serving as a glass-plate carrying-in section, as well as a discharge conveyor 8 disposed on the side of carrying out from the grinding section 3 and serving as a glass-plate carrying-out section.

Figure 1:
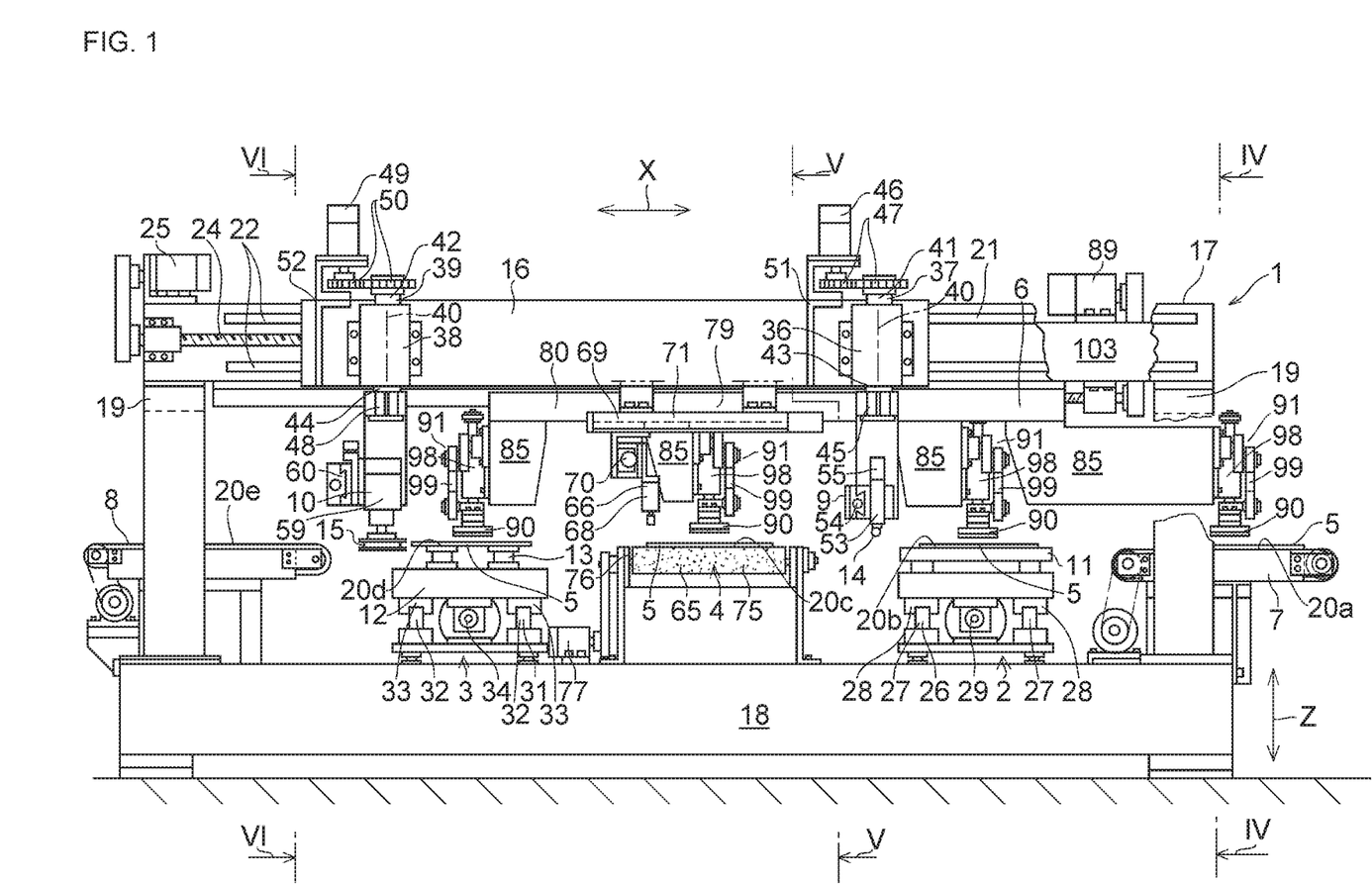
FIG. 1 is an explanatory front elevational view of an embodiment of the mode for carrying out the invention.
Figure 2:
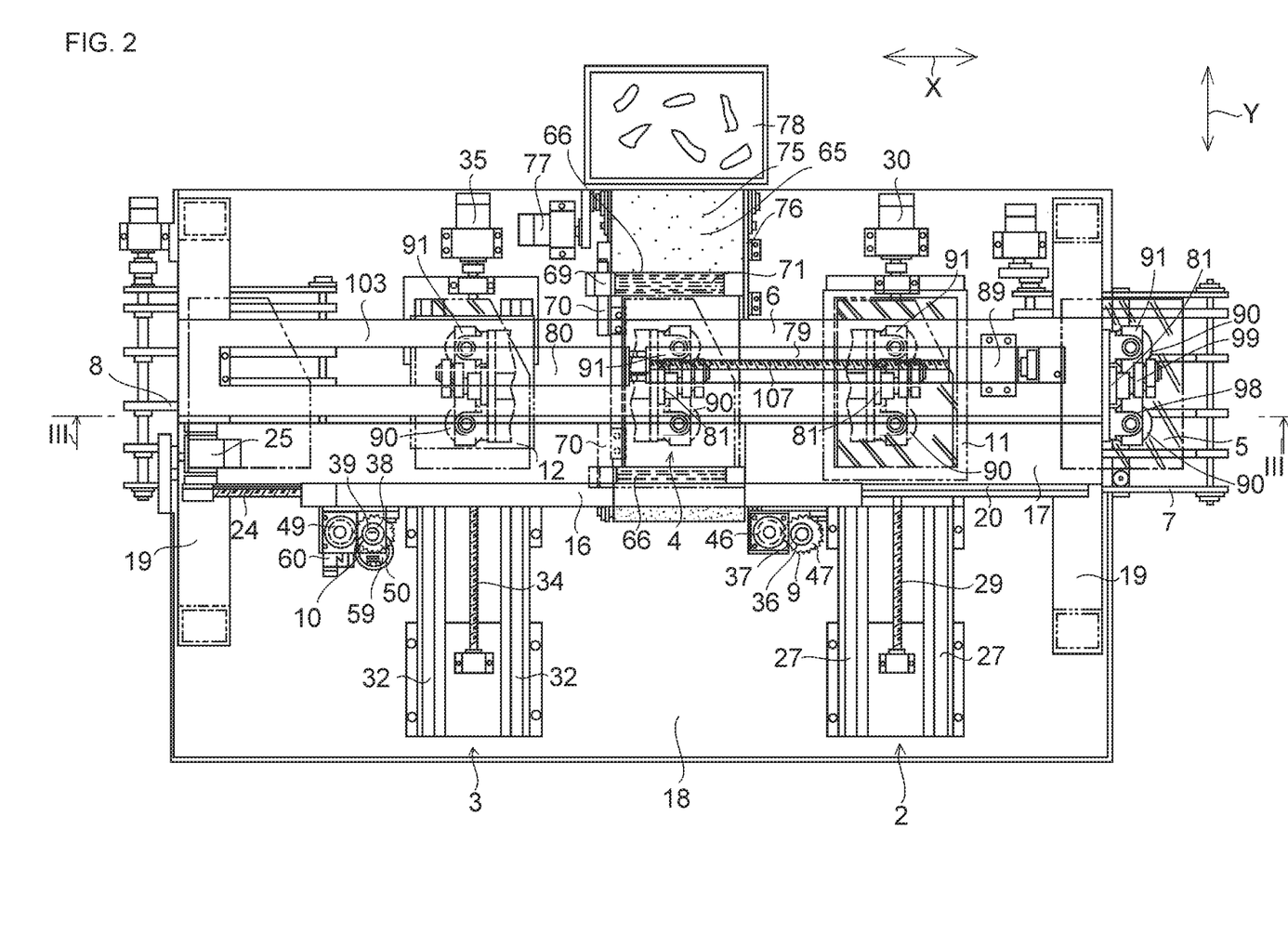
FIG. 2 is an explanatory fragmentary plan view of the embodiment shown in FIG. 1.
Figure 3:
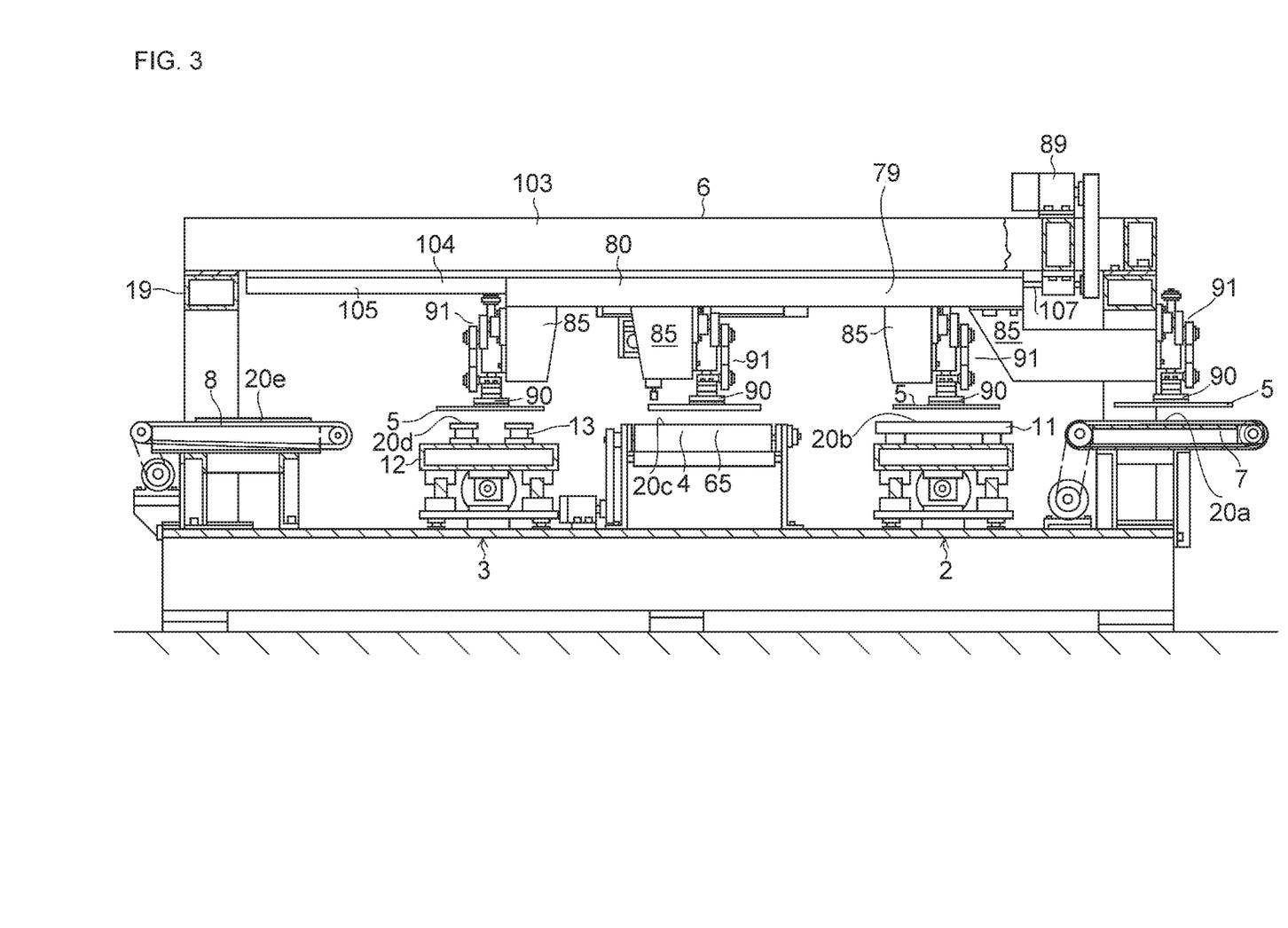
FIG. 3 is an explanatory cross-sectional view taken in the direction of arrows along line III-III shown in FIG. 2.
Figure 4:
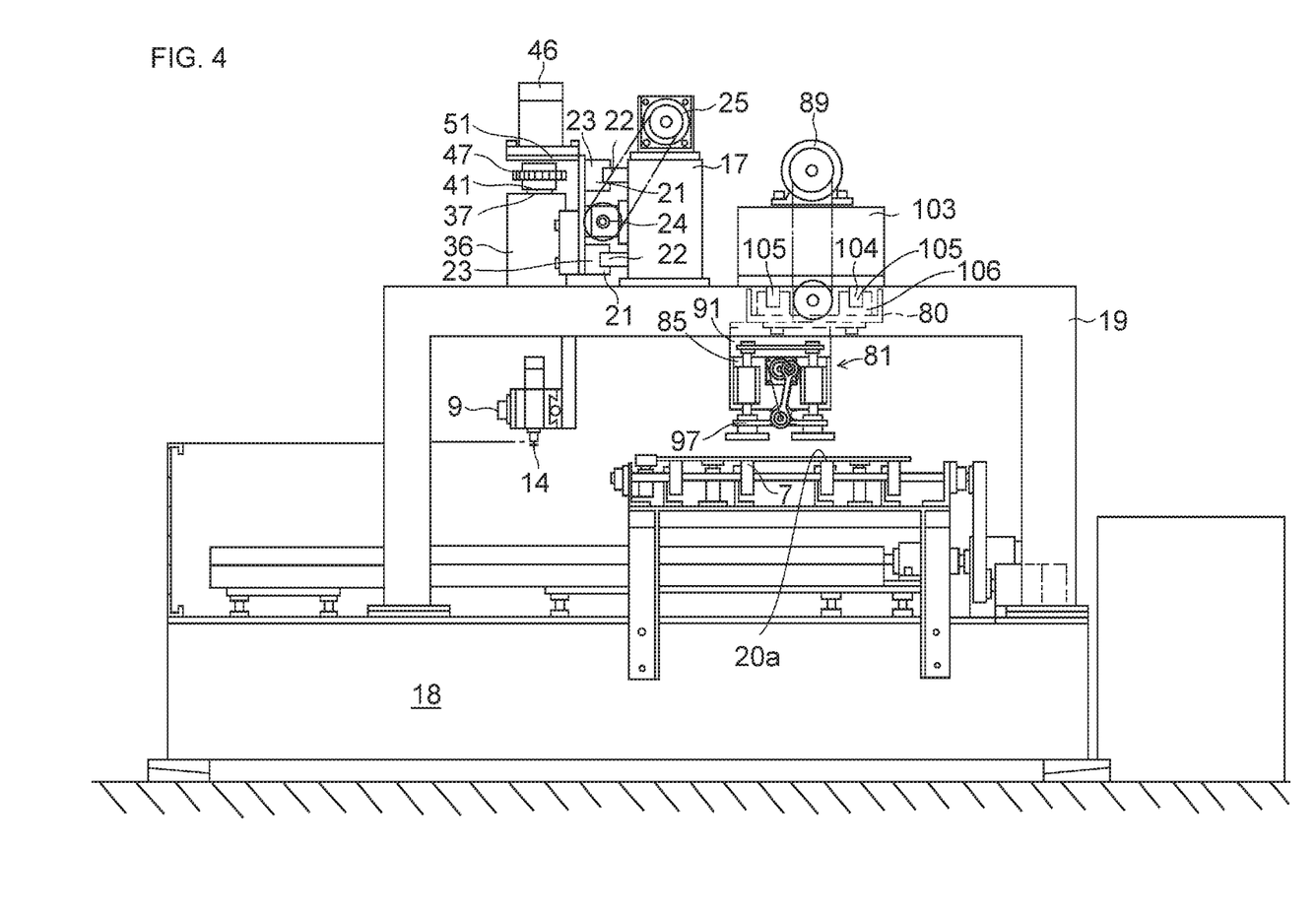
FIG. 4 is an explanatory view taken in the direction of arrows along line IV-IV shown in FIG. 1.
Figure 5:
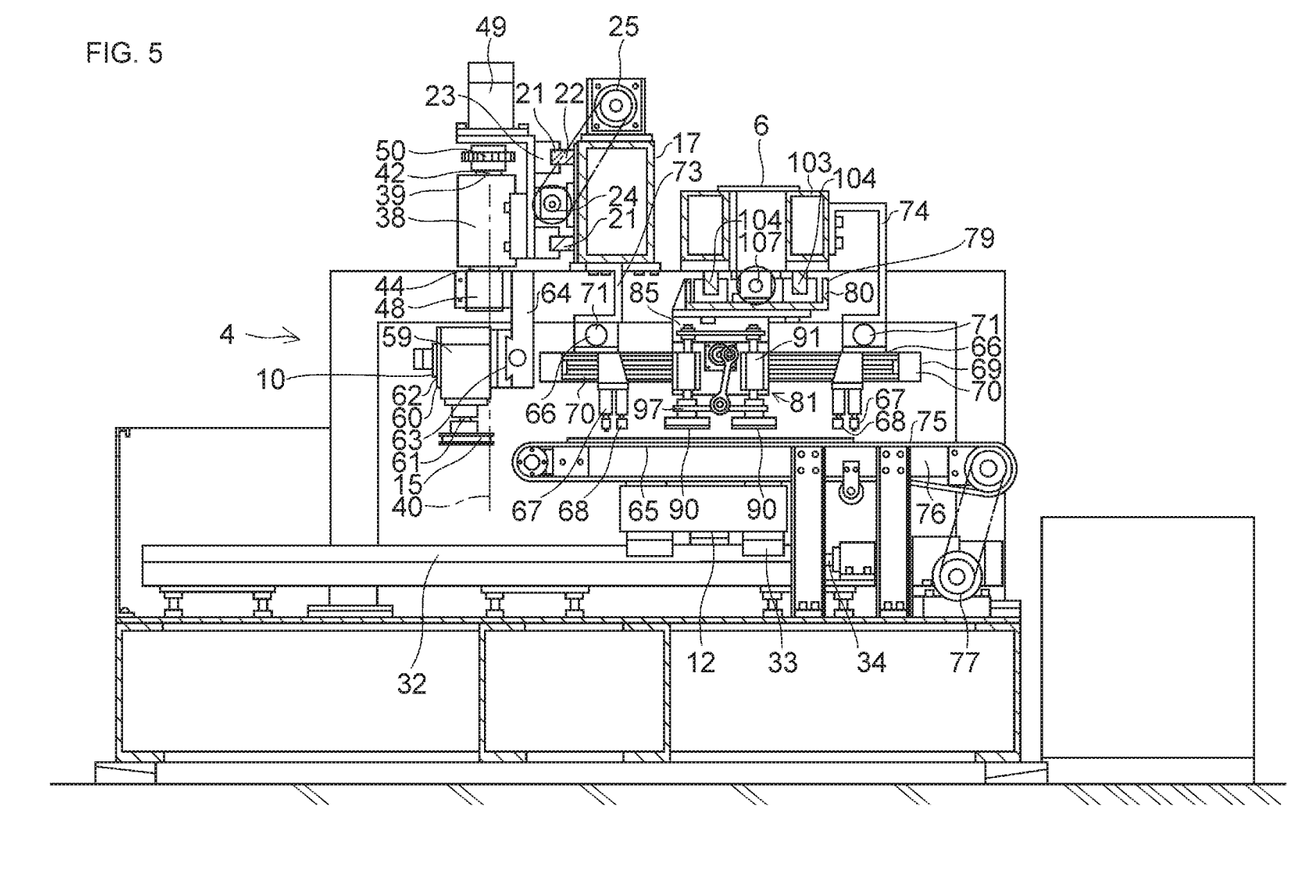
FIG. 5 is an explanatory cross-sectional view taken in the direction of arrows along line V-V shown in FIG. 1.
Figure 6:
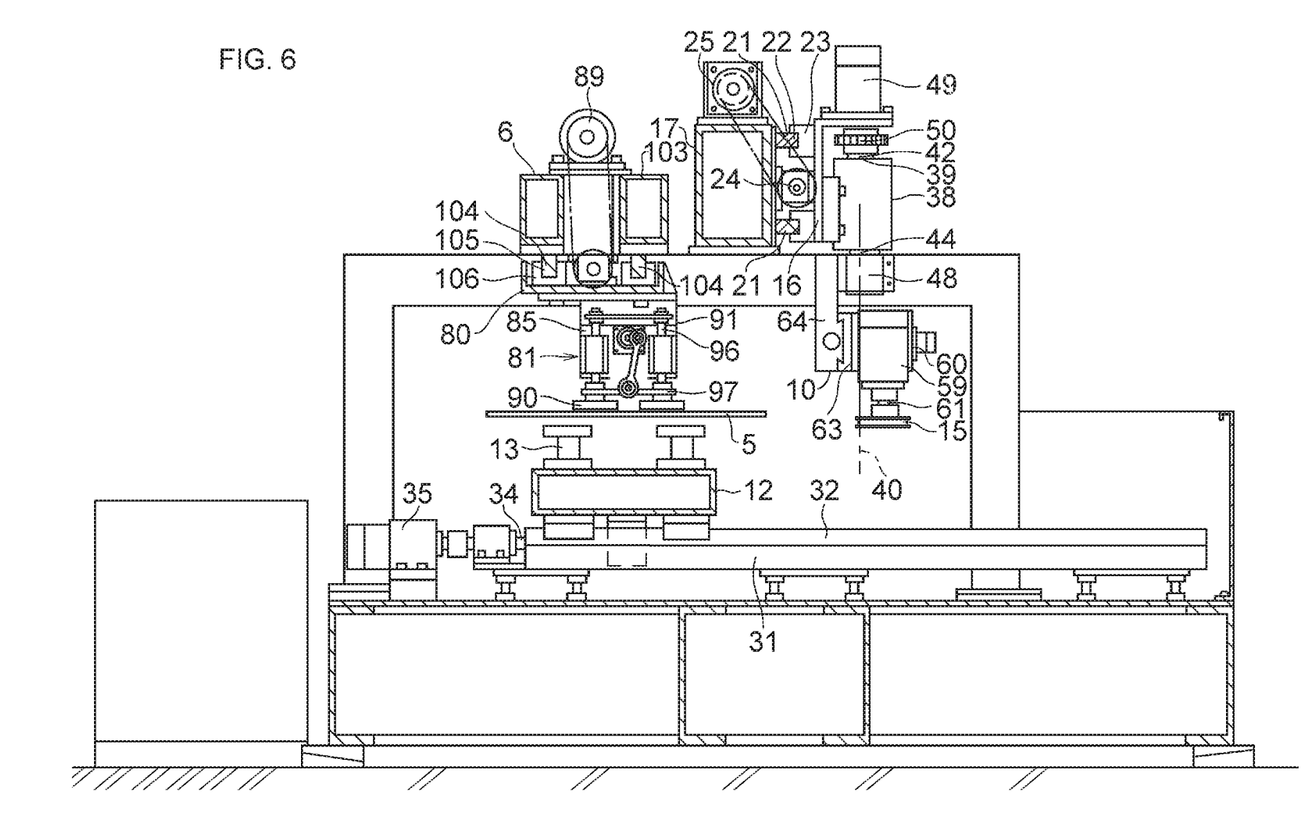
FIG. 6 is an explanatory cross-sectional view taken in the direction of arrows along line VI-VI shown in FIG. 1.

The cutting section 2 includes a cutting head 9 having a cutter wheel 14 as well as a cutting table 11 which is installed below the cutting head 9 in correspondence therewith and serving as a glass-plate supporting portion having an upper surface for planarly supporting the glass plate 5. The grinding section 3 includes a grinding head 10 having a grinding wheel 15 as well as a grinding table 12 which is installed in correspondence with the grinding head 10 and in which a plurality of suction cups 13 serving as glass-plate supporting portions for sucking and holding the glass plate 5 while maintaining the planarity thereof are sucked and secured onto an upper surface thereof respectively. The cutting head 9 and the cutting table 11 are adapted to undergo contour-controlled movement under NC control with respect to the glass plate 5 in an X-Y planar coordinate system consisting of a direction X and a direction Y perpendicular to the direction X. The grinding head 10 and the grinding table 12 are also adapted to undergo contour-controlled movement with respect to an identical glass plate 5 in the X-Y planar coordinate system in parallel simultaneously with the contour-controlled movement of the cutting head 9 and the cutting table 11.

The cutting head 9 and the grinding head 10 are installed on a common moving base 16 which undergoes linear movement in the X-axis direction, i.e., the direction X, the cutting head 9 and, hence, the cutter wheel 14, as well as the grinding head 10 and, hence, the grinding wheel 15, are adapted to be integrally moved linearly in the X-axis direction, while the cutting table 11 which moves in the Y-axis direction, i.e., the direction Y, in correspondence with the cutting head 9, and the grinding table 12 which moves in the Y-axis direction in correspondence with the grinding head 10, are adapted to be mutually synchronously controlled with respect to their movement in the Y-axis direction.

A mount 17 is installed on a pair of portal frames 19 erected at respective ends in the direction X of a machine base 18 above the cutting table 11 and the grinding table 12. A slide rail device 21, which is provided on the front surface of the mount 17 to guidingly move the moving base 16 in the X-axis direction, includes two rails 22 laid on the mount 17 parallel to each other along the X-axis direction and a plurality of slide blocks 23 which are fitted on the each rails 22 movably in the X-axis direction and to which the moving base 16 is affixed. The cutting head 9 and the grinding head 10 are adapted to be integrally moved linearly in the X-axis direction together with the moving base 16 by the slide rail device 21. The linear movement of the moving base 16 in the X-axis direction is effected by a feed screw 24 provided between the rails 22 and threadedly engaged with a nut secured to the moving base 16 and by an X-axis control motor 25 which rotates the feed screw 24.

A slide rail device 26, which guidingly moves the cutting table 11 in the Y-axis direction, i.e., the direction Y, includes each of two rails 27 laid parallel to each other along the Y-axis direction and a plurality of slide blocks 28 which are fitted on the rails 27 movably in the Y-axis direction and to which the cutting table 11 is affixed. The linear movement of the cutting table 11 in the Y-axis direction is effected by a feed screw 29 provided between the rails 27 and threadedly engaged with a nut secured to the cutting table 11 and by a Y-axis control motor 30 which rotates the feed screw 29.

A slide rail device 31, which guidingly moves the grinding table 12 in the Y-axis direction, also includes two rails 32 laid parallel to each other along the Y-axis direction and a plurality of slide blocks 33 which are fitted on each of the rails 32 movably in the Y-axis direction and to which the grinding table 12 is affixed. The linear movement of the grinding table 12 in the Y-axis direction is effected by a feed screw 34 provided between the rails 32 and threadedly engaged with a nut secured to the grinding table 12 and by a Y-axis control motor 35 which rotates the feed screw 34.

The Y-axis control motor 30 and the Y-axis control motor 35, which are disposed independently of each other to allow the cutting table 11 and the grinding table 12 to be moved synchronously in the Y-axis direction, are adapted to be operated synchronously by a numerical controller.

On the front face of the moving base 16 which moves in the X-axis direction, a bearing unit 36 is mounted in correspondence with the cutting table 11, and a bearing unit 38 is mounted in correspondence with the grinding table 12. The bearing unit 36 has a rotating shaft 37 which is held by a bearing (not shown), and the bearing unit 38 has a rotating shaft 39 which is held by a bearing (not shown). Each of the rotating shafts 37 and 39 has a rotational axis 40 which is perpendicular to the X-Y planar coordinate system, i.e., the upper surface of the glass plate 5. The cutting head 9 is mounted at a lower end portion 43 of the rotating shaft 37 by means of a bracket 45 holding that lower end portion 43, while an angle control motor 46 is coupled to an upper end portion 41 of the rotating shaft 37 by means of two mutually meshing spur gears 47. The grinding head 10 is mounted at a lower end portion 44 of the rotating shaft 39 by means of a bracket 48 holding that lower end portion 44, while an angle control motor 49 is coupled to an upper end portion 42 of the rotating shaft 39 by means of two mutually meshing spur gears 50. The angle control motors 46 and 49 are respectively held by brackets 51 and 52 erected from the front face of the moving base 16, and are adapted to move in the X-axis direction integrally with the moving base 16. The rotating shafts 37 and 39 are respectively subjected to angle-controlled rotation by the angle control motors 46 and 49 to thereby cause the cutting head 9 and the grinding head 10 to undergo angle-controlled rotation about the rotational axis 40.

The cutting head 9 includes the cutter wheel 14, a cutter head body 53 having the cutter wheel 14, a position adjusting means 54 for holding the cutter head body 53 and adjusting the position of the cutter head body 53 in the directions X and Y within a plane parallel to the surface of the glass plate 5, and an air cylinder unit 55 which is mounted at an upper portion of the cutter head body 53 and is adapted to vertically move the cutter wheel 14 in a Z-axis direction, i.e., a direction Z perpendicular to the directions X and Y, so as to impart cutting pressure to the cutter wheel 14 at the time of forming a cut line on the glass plate 5.

The position adjusting means 54 includes a Y-direction slide for supporting the cutter head body 53, an X-direction slide for supporting the Y-direction slide movably in the direction Y, and a bracket for holding the X-direction slide movably in the direction X and mounted suspendedly from the bracket 45.

The grinding head 10 has a spindle motor 59 having an output rotating shaft 61 with the grinding wheel 15 mounted thereon and a position adjusting means 60 for adjusting the position of the spindle motor 59 in the direction X and the direction Y, respectively. The position adjusting means 60 has a Y-direction slide 62 for holding the spindle motor 59, an X-direction slide 63 for supporting the Y-direction slide 62 movably in the direction Y, and a bracket 64 for holding the X-direction slide 63 movably in the direction X and mounted suspendedly on the bracket 48. The grinding wheel 15 is so adapted that its peripheral end surface (grinding surface) is aligned with the rotational axis 40 of the rotating shaft 39 through the adjustment by the position adjusting means 60.

The bend-breaking section 4 includes a horizontal belt conveyor 65 on which the glass plate 5 with the cut line formed thereon and transported from the cutting section 2 is placed and two bend-breaking devices 66 for bend-breaking the glass plate 5 placed on the belt conveyor 65. Each of the bend-breaking devices 66 includes an end cutter unit 67, a press unit 68, and a moving means 69 for moving the end cutter unit 67 and the press unit 68 over the glass plate 5 along the surface of the glass plate 5. The moving means 69 has a Y-direction moving unit 70 for holding the end cutter unit 67 and the press unit 68 and moving the end cutter unit 67 and the press unit 68 in the direction Y under numerical control, as well as an X-direction moving unit 71 for moving the Y-direction moving unit 70 in the direction X under numerical control. One bend-breaking device 66 is mounted on the mount 17 by means of a bracket 73 at one X-direction moving unit 71, whereas the other bend-breaking device 66 is mounted on a mount 103 by means of a bracket 74 at the other X-direction moving unit 71. The mount 103 is installed on the pair of frames 19 respectively erected at the fore and aft ends of the machine base 18 in the rear of the mount 17 in parallel therewith.

The belt conveyor 65 has a conveyor belt 75, a supporting plate/frame 76 for supporting the conveyor belt 75 from inside in a planar shape, and a drive unit 77 for causing the conveyor belt 75 to circulatingly travel, and is supported at the supporting plate/frame 76 by the machine base 18 via a bracket.

In the bend-breaking position 4, the glass plate 5 with the cut line formed thereon in the cutting section 2 is transferred onto the conveyor belt 75 by being lifted by a glass-plate lifting device 81 corresponding to the cutting section 2 and by the conveyance of the glass plate by the movement of a transport shuttle 80. The glass plate 5 placed on the conveyor belt 75 is pressed and fixed by the lowering of suction pads 90 of the glass-plate lifting device 81 which returned to the bend-breaking section 4. Each of the end cutter units 67 is sequentially moved to required portions to form end cut lines to the glass plate 5 fixed on the conveyor belt 75. Next, each of the press units 68 is sequentially moved to required portions of the glass plate 5 with the end cut lines formed thereon, and subjects that glass plate 5 to pressing to bend-break and separate unwanted portions. The glass plate 5 whose unwanted portions have been bend-broken and separated is sucked and lifted by the suction pads 90 of the glass-plate lifting device 81, and is set on standby in this state so as to be subsequently transported to the grinding section 3. During this standby, the belt conveyor 65 is operated to cause the conveyor belt 75 to travel, and, through this traveling, bend-broken cullets on the conveyor belt 75 are discharged to a bend-broken cullet accommodating box 78 in the outside, and, after the discharge of the bend-broken cullets, the traveling of the conveyor belt 75 is stopped.

The glass-plate transporting section 6 is provided with a transporting device 79 which has the transport shuttle 80 and the plurality of glass-plate lifting devices 81. As the transport shuttle 80 is reciprocated repeatedly, the transporting device 79 is adapted to transport the glass plate 5 on the feed conveyor 7 onto the cutting table 11, transport the glass plate 5 on the cutting table 11 onto the conveyor belt 75 of the bend-breaking section 4, transport onto the plurality of suction cups 13 of the grinding table 12 the glass plate 5 which has been bend-broken in the bend-breaking section 4 and is being lifted by the suction pads 90, and transport the glass plate 5 on the suction cups 13 of the grinding table 12 onto the discharge conveyor 8, to thereby sequentially send the glass plate 5 from one stage to another. The glass plate 5 is thus adapted to be placed on a glass-plate supporting portion 20*a* on the feed conveyor 7, on a glass-plate supporting portion 20*b* on the cutting table 11, on a glass-plate supporting portion 20*c* on the belt conveyor 65 of the bend-breaking section 4, on glass-plate supporting portions 20*d* on the suction cups 13 of the grinding table 12, and on a glass-plate supporting portion 20*e* on the discharge conveyor 8. Further, on the glass-plate supporting portions 20*b* and 20*d*, the glass plate 5 is adapted to be fixedly supported or held during the processing operation.

The transport shuttle 80, which is provided above the feed conveyor 7, the cutting table 11, the belt conveyor 65, and the suction cups 13, respectively, is adapted to repeat reciprocating movement in the X-axis direction, and is also adapted to reach above the discharge conveyor 8 in this reciprocating movement. Each glass-plate lifting device 81 is provided by being mounted on the lower surface of the transport shuttle 80 via a bracket 85 at a position corresponding to each processing position, i.e., at a position corresponding to each of the glass-plate supporting portion 20*a*, the glass-plate supporting portion 20*b*, the glass-plate supporting portion 20*c*, and the glass-plate supporting portions 20*d*. Thus, the transport shuttle 80 and the respective glass-plate lifting devices 81 are adapted to be integrally reciprocated in the direction X under numerical control by a transport controlling motor 89.

Each glass-plate lifting device 81 has the suction pads 90 which suck and hold the glass plate 5 by coming into contact with the surface of the glass plate 5 and release the suction and holding of the glass plate 5, as well as a lifting unit 91 for raising and lowering the suction pads 90.

Each lifting unit 91 has a slide unit 98 for holding the pair of suction pads 90 and guiding the linear raising and lowering and a slider crank mechanism 99 for raising and lowering the suction pads 90 held by the slide units 98. The slide unit 98 has a pair of slide unit bodies 95 each having a slide shaft 96, as well as a coupling body 97 which couple the slide shafts 96 and on a lower surface of which the suction pads 90 are mounted. Each of the slide units 95 has a case body 101 and the slide shaft 96 which slides inside the case body 101, and the slide units 95 are mounted on the bracket 85 at the case bodies 101.

The slider crank mechanism 99 includes a lifting motor 100 mounted on the bracket 85 and constituted by a reducer directly-coupled servo motor which is numerically controlled; a crankshaft 110 which is fixedly mounted on an output rotating shaft 102 of the reducer of the lifting motor 100; a crank arm 111 provided on the crankshaft 110 projectingly in the radial direction; a crank pin 112 projecting from the crank arm 111; and a connecting rod 114 which is rotatively connected to both the crank pin 112 and a slider pin 113 serving as a slider mounted on the coupling body 97. The rotative coupling of the connecting rod 114 with respect to the crank pin 112 and the slider pin 113 is effected through a bearing 115.

Figure 7:
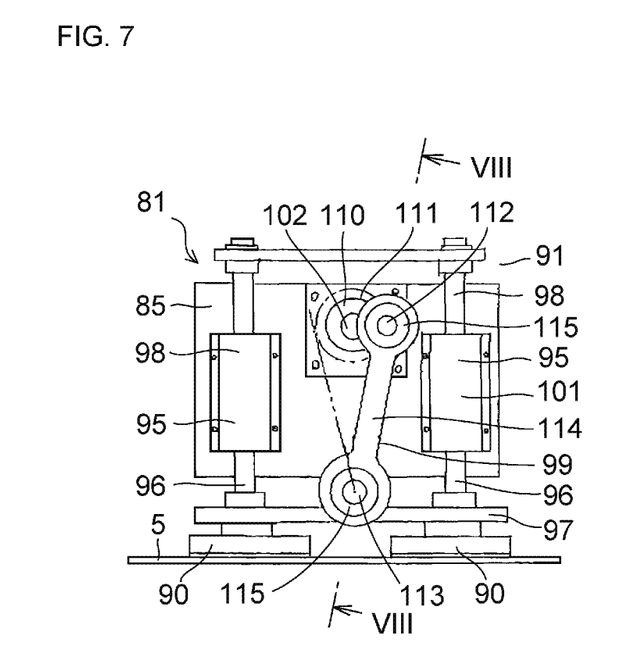
FIG. 7 is an explanatory front elevational view of a lifting unit of the transporting device in the embodiment shown in FIG. 1.
Figure 8:
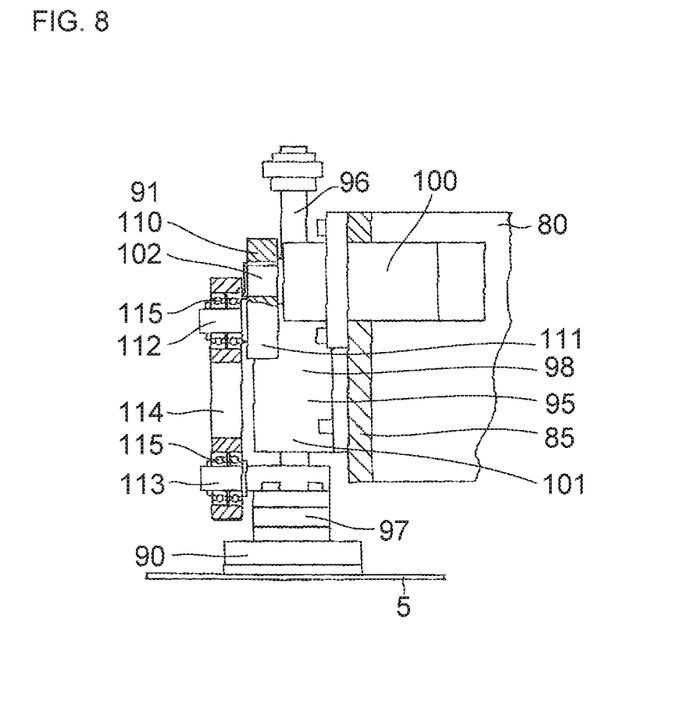
FIG. 8 is an explanatory cross-sectional view taken in the direction of arrows along line VIII-VIII shown in FIG. 7.
Figure 9:
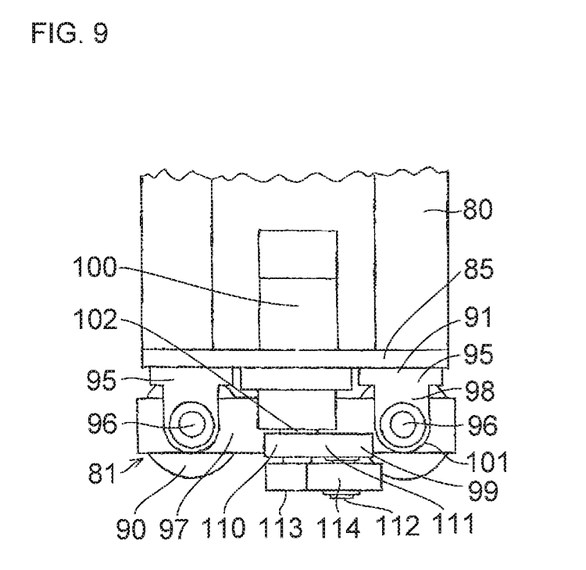
FIG. 9 is an explanatory plan view of the lifting unit shown in FIG. 7.
Figure 10:
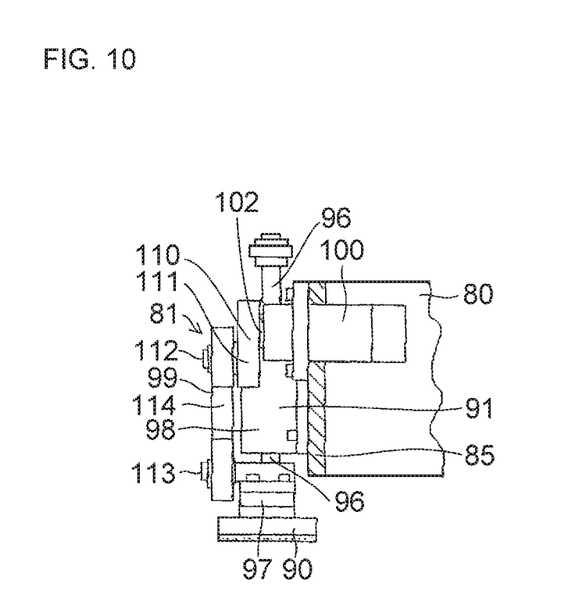
FIG. 10 is an explanatory fragmentary side elevational view of the lifting unit shown in FIG. 7.

The slider crank mechanism 99 is adapted to rotate the crank arm 111 through the crankshaft 110 by the rotation of the output rotating shaft 102 based on the operation of the lifting motor 100 to thereby cause the coupling body 97 and, hence, the suction pads 90 through the connecting rod 114 rotatively connected to the crank pin 112 and the slider pin 113 to linearly reciprocate vertically. Hence, the slider crank mechanism 99 is adapted to convert the rotation of the output rotating shaft 102 of the lifting motor 100 to the vertical reciprocating motion of the suction pads 90.

The transport shuttle 80 is mounted on a slide device 104 which is installed in parallel in the X-axis direction on the lower surface of the mount 103. The slide device 104 has a pair of rails 105 laid in parallel and slide blocks 106 which are assembled to the rails 105 movably in the direction X and on which the transport shuttle 80 is mounted. The reciprocating movement of the transport shuttle 80 in the direction X is adapted to be effected by a feed screw 107 which is rotatably mounted on the mount 103 between the rails 105 and is threadedly engaged with the nut of the transport shuttle 80, and by the rotation of the output rotating shaft of the transport controlling motor 89 coupled to the feed screw 107 and based on numerical information from a numerical controller.

When the glass-plate working apparatus 1 is effecting processing operation in the respective processing positions, the transport shuttle 80 which reciprocates is on standby at a return position, and the glass-plate lifting devices 81 are respectively on standby above the feed conveyor 7, above the cutting table 11, and above the grinding table 12. At this juncture, the glass-plate lifting device 81 corresponding to the belt conveyor 65 is located above the belt conveyor 65 and is pressing the glass plate 5 on the belt conveyor 65 after having lowered its suction pads 90 to a lowermost position, and the bend-breaking devices 66 are operated to bend-break the glass plate 5. Upon completion of bend-breaking by the bend-breaking devices 66, the suction pads 90 suck the glass plate 5, lift up the glass plate 5 to an uppermost position, and remain on standby to await integral movement in the direction X together with the other suction pads 90. When the processing operation at the respective processing positions is finished, and the cutting table 11 and the grinding table 12 return to their points of origin, the respective glass-plate lifting devices 81, excluding the glass-plate lifting device 81 located at the bend-breaking section 4, concurrently cause the suction pads 90 to be lowered by means of the lifting units 91, and then to be brought into contact with the glass plates 5 and suck the glass plates 5, and the glass plates 5 are lifted up in conjunction with the raising of the suction pads 90. Simultaneously with the completion of the raising of the glass plates 5, the transport shuttle 80 starts its advance stroke, so that the glass plates 5 in the respective processing positions start to be transported to the respective ensuing processing positions. When the suction pads 90 respectively reach above the glass-plate supporting portions 20b, 20c, 20d, and 20e of the ensuing processing positions and the transport shuttle 80 stops, the suction pads 90 are lowered to respectively bring the glass plates 5 into contact with the upper surfaces of the glass-plate supporting portions 20b, 20c, 20d, and 20e, and the glass plates 5 are then released from suction by the suction pads 90 to be transferred onto the glass-plate supporting portions 20b, 20c, 20d, and 20e. Next, the respective glass-plate lifting devices 81 cause the lifting units 91 to raise the suction pads 90, the transport shuttle 80 simultaneously start its return stroke, and the glass-plate working apparatus 1 concurrently commences the processing operation in the respective processing positions.

When the respective glass-plate lifting devices 81 have returned above supporting bases of their original processing positions, the suction pads 90 are set on standby above the glass-plate supporting portions.

When the glass-plate supporting portions respectively supporting the glass plates 5, i.e., the cutting table 11 and the grinding table 12, return to their points of origin upon completion of the processing operation in the respective processing positions, the glass-plate transporting section 6 repeats the same operation as described above, and sends the glass plates 5 sequentially to the respective processing positions. The worked glass plate 5 which has been sequentially sent to the final discharge conveyor 8 is discharged as a processing finished article.

As described above, the glass-plate working apparatus 1 is comprised of the feed conveyor 7, the cutting section 2, the bend-breaking section 4, the grinding section 3, and the discharge conveyor 8 which respectively have the glass-plate supporting portions 20a, 20b, 20c, 20d, and 20e for supporting the respective glass plates 5 to be processed thereon and are arranged at intervals with each other; and the transporting device 79 for transporting the glass plate 5 from the glass-plate supporting portion 20a of the feed conveyor 7 to the glass-plate supporting portion 20b of the cutting section 2, from the glass-plate supporting portion 20b to the glass-plate supporting portion 20c of the bend-breaking section 4, from the glass-plate supporting portion 20c to the glass-plate supporting portions 20d of the grinding section 3, and from the glass-plate supporting portions 20d to the glass-plate supporting portion 20e of the discharge conveyor 8. The transporting device 79 includes the transport shuttle 80 which reciprocates in the direction X between the glass-plate supporting portions 20a and 20b, between the glass-plate supporting portions 20b and 20c, between the glass-plate supporting portions 20c and 20d, and between the glass-plate supporting portions 20d and 20e; and the suction pads 90 mounted on the transport shuttle 80 through the respective lifting units 91. Through the reciprocating movement of the transport shuttle 80, the raising and lowering of the suction pads 90 by the respective lifting units 91, and the suction of, and releasing of suction of, the glass plates 5 by the suction pads 90, the transporting device 79 is adapted to transport the glass plate 5 from the glass-plate supporting portion 20a of the feed conveyor 7 to the glass-plate supporting portion 20b of the cutting section 2, from the glass-plate supporting portion 20b to the glass-plate supporting portion 20c of the bend-breaking section 4, from the glass-plate supporting portion 20c to the glass-plate supporting portions 20d of the grinding section 3, and from the glass-plate supporting portions 20d to the glass-plate supporting portion 20e of the discharge conveyor 8. Each lifting unit 91 includes the slider crank mechanism 99 having the crankshaft 110 and the slider pin 113. The crankshaft 110 is coupled to the lifting motor 100 which is mounted on the transport shuttle 80 and is preferably a numerically controlled servo motor. The suction pads 90 are mounted on the slider pin 113 and are adapted to be raised and lowered by the operation of the lifting motor 100. Moreover, as the lifting motor 100 and the transport controlling motor 89 are simultaneously controlled, the lifting units 91 and the suction pads 90 are caused to raise the glass plates 5 in the transporting movement of the glass plates 5 in the direction X from the glass-plate supporting portion 20a of the feed conveyor 7 to the glass-plate supporting portion 20b of the cutting section 2, from the glass-plate supporting portion 20b to the glass-plate supporting portion 20c of the bend-breaking section 4, from the glass-plate supporting portion 20c to the glass-plate supporting portions 20d of the grinding section 3, and from the glass-plate supporting portions 20d to the glass-plate supporting portion 20e of the discharge conveyor 8. As the cutting section 2, the bend-breaking section 4, the grinding section 3, and the discharge conveyor 8 to which the glass plates 5 are respectively transferred are approached, the lifting units 91 are caused to gradually lower the glass plates 5. In this glass-plate working apparatus 1, each slider crank mechanism 99 converts the rotary motion of the crank shaft 110 due to the lifting motor 100 to the lifting motion of the suction pads 90 in the direction Z, so that it is unnecessary to rotate the crankshaft 110 forwardly and reversely each time the suction pads 90 are raised and lowered, and therefore it is sufficient to rotate the crankshaft 110 in one direction. In addition, in the slider crank mechanism 99, a lifting/lowering speed V of the slider pin 113, i.e., the suction pads 90, in the direction Z becomes zero (V=0) at a top dead center and a bottom dead center at the time of turning back in the lifting and lowering of the suction pads 90. Namely, the speed becomes zero at a shifting position from lifting to lowering of the suction pads 90 in the direction Z and at a shifting position from lowering to lifting. Further, since a deceleration (deceleration curve) to this speed V=0 and an acceleration (acceleration curve) from this speed V=0 are smooth, the suction and lifting of the glass plates 5 from the glass-plate supporting portions 20a, 20b, 20c, and 20d by the suction pads 90 and the lowering and placement of the glass plates 5 onto the glass-plate supporting portions 20b, 20c, 20d, and 20e by the suction pads 90 can be effected gently. Moreover, by adjusting the position of the bottom dead center in the raising and lowering of the suction pads 90 to the immediate vicinities of the upper surfaces of the glass-plate supporting portions 20a, 20b, 20c, and 20d, it is possible to reliably perform the raising of the glass plates 5 from the glass-plate supporting portions 20a, 20b, 20c, and 20d on the basis of the suction of the glass plates 5 by the suction pads 90 as well as the placement of the glass plates 5 onto the glass-plate supporting portions 20b, 20c, 20d, and 20e on the basis of the release of suction of the glass plates 5 by the suction pads 90.

In the glass-plate working apparatus 1, the grinding section 3 is so arranged that the grinding head 10 and the grinding table 12 undergo contour-controlled movement in the X-Y coordinate system; however, a contour control system in a polar coordinate system may be adopted in which the grinding head 10 is fixed, while the grinding table 12 holding the glass plate 5 is rotated under angular control and is moved along the Y-axis, and, in the Y-axis zero return of the grinding table 12, the carrying in and carrying out of the glass plate 5 to and from the grinding section 3 may be effected by the suction pads 90 of the lifting unit 91 of the transporting device 79.

Furthermore, although the glass-plate working apparatus 1 has the bend-breaking section 4 between the cutting section 2 and the grinding section 3, the bend-breaking section 4 may be omitted, and cutting and bend-breaking may be carried out continuously in the bend-breaking of the glass plate 5 in the cutting section 2. Namely, the cutting head 9 may be additionally provided with the press unit 68 to effect bend-breaking by the press unit 68 immediately after the formation of a cut line by the cutter wheel 14, and the glass plate 5 may be transported to the grinding section 3 by this cutting section 2 also having a bend-breaking function. In other words, one processing position is a cutting and bend-breaking section for forming a cut line on the surface of the glass plate 5 and bend-breaking the glass plate 5 according to the cut line, and another processing position may be the grinding section 3 for grinding the peripheral edges of the glass plate 5.

DESCRIPTION OF REFERENCE NUMERALS AND SIGNS

1: glass-plate working apparatus
2: cutting section
3: grinding section
4: bend-breaking section
5: glass plate
6: glass-plate transporting section
7: feed conveyor
8: discharge conveyor

The invention claimed is:

1. A glass-plate working apparatus comprising:
at least two processing positions which each have a glass-plate supporting portion for supporting thereon a glass plate subject to processing and are arranged with an interval therebetween; and
a transporting device for transferring the glass plate from the glass-plate supporting portion of one of said at least two processing positions to the glass-plate supporting portion of another one of said at least two processing positions,
said transporting device including a transport shuttle which reciprocates between the glass-plate supporting portions of said one and said other processing positions and a suction pad mounted on the transport shuttle through a lifting unit,
the transporting device being adapted to transport the glass plate from said one processing position to said other processing position through reciprocating movement of the transport shuttle, raising and lowering of the suction pad by the lifting unit, and suction of, and releasing of suction of, the glass plate by the suction pad,
said lifting unit having a slide unit for holding the suction pad and guiding the linear raising and lowering of the suction pad and a slider crank mechanism for raising and lowering the suction pad held by the slide unit,
said slide unit having a coupling body which on a lower surface of which the suction pad is mounted,
said slider crank mechanism including a lifting motor mounted on the transport shuttle; a crankshaft rotating in one direction which is mounted on an output rotating shaft of the lifting motor; a crank arm provided on the crankshaft projectingly in the radial direction; a crank pin projecting from the crank arm; and a connecting rod which is rotatively connected to both the crank pin and a slider pin mounted on the coupling body, and
said slider crank mechanism is adapted to rotate the crank arm through the crankshaft by the rotation of the output rotating shaft in the one direction based on the operation of the lifting motor to thereby cause the coupling body through the connecting rod rotatively connected to the crank pin and the slider pin to linearly reciprocate vertically,
wherein the crankshaft and the crank pin are parallel to one another.

2. The glass-plate working apparatus according to claim 1, wherein the lifting motor is a servo motor which is numerically controlled.

3. The glass-plate working apparatus according to claim 1, wherein said transporting device includes a transport controlling motor for causing the transport shuttle to reciprocate, and wherein as the lifting motor and the transport controlling motor are simultaneously controlled, in the transporting movement of the glass plate from said one processing position to said other processing position, the lifting unit and the suction pad are caused to raise the glass plate, and, as said other processing position to which the glass plate is transferred is approached, the lifting unit is caused to gradually lower the glass plate.

4. The glass-plate working apparatus according to claim 1, wherein said one processing position is that of a cutting and bend-breaking section for forming a cut line on a surface of the glass plate and for bend-breaking the glass plate according to the cut line, and said other processing position is that of a grinding section for grinding a peripheral edge of the glass plate.

5. A glass-plate working apparatus comprising:
   at least two processing positions which each have a glass-plate supporting portion for supporting thereon a glass plate subject to processing and are arranged with an interval therebetween; and
   a transporting device for transferring the glass plate from the glass-plate supporting portion of one of said at least two processing positions to the glass-plate supporting portion of another one of said at least two processing positions,
   said transporting device including a transport shuttle which reciprocates between the glass-plate supporting portions of said one and said other processing positions and a pair of suction pads mounted on the transport shuttle through a lifting unit,
   the transporting device being adapted to transport the glass plate from said one processing position to said other processing position through reciprocating movement of the transport shuttle, raising and lowering of the pair of suction pads by the lifting unit, and suction of, and releasing of suction of, the glass plate by the pair of suction pads,
   the lifting unit including a slide unit for holding the pair of suction pads and guiding linear raising and lowering of the pair of suction pads and a slider crank mechanism for raising and lowering the pair of suction pads held by the slide unit,
   said slide unit having a coupling body which on a lower surface of which the pair of suction pads are mounted,
   said slider crank mechanism including a lifting motor mounted on the transport shuttle; a crankshaft rotating in one direction which is mounted on an output rotating shaft of the lifting motor; a crank arm provided on the crankshaft projectingly in the radial direction; a crank pin projecting from the crank arm; and a connecting rod which is rotatively connected to both the crank pin and a slider pin mounted on the coupling body, and
   said slider crank mechanism is adapted to rotate the crank arm through the crankshaft by the rotation of the output rotating shaft in the one direction based on the operation of the lifting motor to thereby cause the coupling body through the connecting rod rotatively connected to the crank pin and the slider pin to linearly reciprocate vertically,
   wherein the crankshaft and the crank pin are parallel to one another.

6. The glass-plate working apparatus according to claim 5, wherein the lifting motor is a servo motor which is numerically controlled.

7. The glass-plate working apparatus according to claim 5, wherein said transporting device includes a transport controlling motor for causing the transport shuttle to reciprocate, and wherein as the lifting motor and the transport controlling motor are simultaneously controlled, in the transporting movement of the glass plate from said one processing position to said other processing position, the lifting unit and the pair of suction pads are caused to raise the glass plate, and, as said other processing position to which the glass plate is transferred is approached, the lifting unit is caused to gradually lower the glass plate.

8. The glass-plate working apparatus according to claim 5, wherein said transporting device includes a transport controlling motor for causing the transport shuttle to reciprocate, and wherein as the lifting motor and the transport controlling motor are simultaneously controlled, in the transporting movement of the glass plate from said one processing position to said other processing position, as said other processing position to which the glass plate is transferred is approached, the lifting unit is caused to gradually lower the glass plate.

9. The glass-plate working apparatus according to claim 5, wherein said one processing position is that of a cutting and bend-breaking section for forming a cut line on a surface of the glass plate and for bend-breaking the glass plate according to the cut line, and said other processing position is that of a grinding section for grinding a peripheral edge of the glass plate.

\* \* \* \* \*